United States Patent
Sako et al.

(10) Patent No.: US 7,295,741 B2
(45) Date of Patent: Nov. 13, 2007

(54) OPTICAL FIBER, OPTICAL FIBER RIBBON, AND OPTICAL INTERCONNECTION SYSTEM

(75) Inventors: Akifumi Sako, Tokyo (JP); Ryuichi Sugizaki, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 99 days.

(21) Appl. No.: 11/200,100

(22) Filed: Aug. 10, 2005

(65) Prior Publication Data

US 2006/0034575 A1    Feb. 16, 2006

(30) Foreign Application Priority Data

Aug. 11, 2004 (JP) ............................. 2004-234557
Jun. 24, 2005 (JP) ............................. 2005-185166
Jul. 6, 2005 (JP) ............................. 2005-197894

(51) Int. Cl.
*G02B 6/36* (2006.01)

(52) U.S. Cl. ........................................ 385/127

(58) Field of Classification Search ......... 385/127–128
See application file for complete search history.

(56) References Cited

U.S. PATENT DOCUMENTS 6,888,993 B2 * 5/2005 Zhang .................. 385/127

| | | | |
|---|---|---|---|
| 2002/0102082 A1 | 8/2002 | Sarchi et al. | |
| 2002/0163688 A1 | 11/2002 | Zhu et al. | |
| 2003/0223716 A1 * | 12/2003 | Christoff et al. ............ 385/124 |
| 2003/0223717 A1 | 12/2003 | Blaszyk et al. | |
| 2005/0244120 A1 * | 11/2005 | Mishra .................. 385/127 |
| 2006/0034575 A1 | 2/2006 | Sako et al. | |

FOREIGN PATENT DOCUMENTS

EP    1 507 156 A1    2/2005

OTHER PUBLICATIONS

U.S. Appl. No. 11/271,823, filed Nov. 14, 2005, Sako et al.
U. Manyam, et al., "Bend Loss in Reduced Cladding Optical Fibers", Optical Fiber Communication Conference, Postconference Digest, XP-010680117, vol. 86, Mar. 23, 2003, pp. 296-297.

(Continued)

*Primary Examiner*—Sung Pak
*Assistant Examiner*—Jerry T. Rahll
(74) *Attorney, Agent, or Firm*—Oblon, Spivak, McClelland, Maier & Neustadt, P.C.

(57) ABSTRACT

An optical fiber includes a core and a cladding which are made from silica glass, allows single mode transmission at a wavelength of 1100 nm, and has a mode field diameter of not less than 4 μm at a wavelength of 1100 nm, and a bending loss of not more than 1 dB per turn with a curvature radius of 1 mm at a wavelength of 1100 nm.

20 Claims, 4 Drawing Sheets

OTHER PUBLICATIONS

Shoichiro Matsuo, et al., "Bend-Insensitive and Low-Splice-Loss Optical fiber for Indoor Wiring in FTTH", Optical Fiber Communication Conference, XP-010745853, vol. Feb. 26, 2004, pp. 157-159.

Timothy C. Starkley, et al., "Reduced Mode-Field Diameter Single-Mode Fiber for Specialty Applications", Proceedings of International Wire and Cable Symposium, XP-009036808, vol. 37, Nov. 15, 1988, pp. 591-592.

F. Koyama et al., "1.2 μm highly strained GaInAs/ GaAs quantum well lasers for singlemode fibre datalink", Electronics Letters, vol. 35, No. 13, Jun. 24, 1999, pp. 1079-1081.

F. Koyama et al. "Data Transmission Over Single-Mode Fiber by Using 1.2- μm Uncooled GaInAs/GaAs Laser for Gb/s Local Area Network", IEEE Photonics Technology Letters, vol. 12, No. 2, Feb. 2000, pp. 125-127.

* cited by examiner

OPTICAL FIBER, OPTICAL FIBER RIBBON, AND OPTICAL INTERCONNECTION SYSTEM

BACKGROUND OF THE INVENTION

1. Field of the Invention

The present invention relates to an optical fiber, and, more particularly to an optical fiber and an optical fiber ribbon for optical wiring in equipment, ribbon and an optical interconnection system using the optical fiber or the optical fiber ribbon.

2. Description of the Related Art

There are two types of signal transmission in equipment, electrical transmission and optical interconnection. The electrical transmission has a problem with electrical crosstalk due to high density wiring as well as recent high CPU clock speed, thereby requiring specific applications such as reshaping. As a result, the electrical transmission, when used as a signal transmission in equipment, allows a transmission range of at most 100 meters and a transmission rate of at most 10 Gbps. On the other hand, the optical interconnection, when used as a signal transmission in equipment, allows extreme broadband transmission as compared with the electrical transmission, and can provide a signal transmission system using optical elements with small size and low power consumption. Therefore, the optical interconnection system now draws attention as a signal transmission in equipment replacing the electrical transmission.

The optical interconnection uses, for example, optical waveguide circuits or optical fibers, to transmit optical signals. Since it is preferable that all the optical elements used in equipment occupy as little space as possible, the optical fiber, which allows flexible wiring and low loss optical transmission, is especially an optical element suitable for the optical interconnection.

Conventionally, multimode fibers (MMFs) have been used for short-range optical transmission. A conventional MMF fiber has a core diameter about ten times that of a singlemode fiber (SMF), in other words, its numerical aperture is sufficiently large. Accordingly, the MMF fiber does not require an accurate connection between the fiber and other optical element such as a light source, thereby allowing an easy connection. In an optical transmission system using such an MMF fiber, a vertically cavity surface emitting laser (VCSEL) with an emission wavelength of 850 nanometers and a graded index optical fiber are widely used as a light source and an optical transmission medium, respectively. The graded index optical fiber, which is a type of multimode fiber, has a core with an optimal formation of refractive index profile to mitigate the impact of mode dispersion. The graded index optical fiber in which the formation of refractive index profile is accurately controlled allows high-speed optical communication at about a transmission rate of 10 Gbps and over a range of about 100 meters.

However, for further long range transmission or further high speed transmission, application of a broadband SMF is being examined. As a light source used for such application, a GaInAs/GaAs laser diode is now being studied. This laser diode has an emission wavelength of 1100 to 1200 nanometers, a low lasing threshold, and excellent temperature characteristics, may be directly modulated at 10 Gbps, and is therefore drawing attention as a light source for local area network (LAN), for example. Since the emission wavelength can be controlled, so far one with an emission wavelength of 1100 nanometer and one with 1200 nanometers are being studying and are presented at an academic conference and the like.

For example, a transmission system through SMF fibers using GaInAs/GaAs quantum well lasers as a light source is disclosed in Gain F. Koyama et al., 1.2 μm *highly strained GaInAs/GaAs quantum well lasers for single-mode fibre datalink*, ELECTRONICS LETTERS, Vol. 35, No. 13, pp. 1079-1081, June, 1999 and F. Koyama et al., *Data Transmission Over Single-Mode Fiber by Using* 1.2 μm *Uncooled GaInAs/GaAs Laser for Gb/s Local Area Network*, PHOTONICS TECHNOLOGY LETTERS, Vol. 12, No. 2, pp. 125-127, February, 2000. The use of a SMF fiber allows high speed optical communication with a transmission rate of about 40 Gbps.

Consequently, the realization of an optical fiber that has a low bending loss and a low splicing loss, allows high-speed optical transmission, and is suitable for building an optical interconnection system, is desired. Moreover, the realization of an optical fiber that has a small bending diameter in laying and a low failure rate in bending, and that its slack can be stored, is desired.

SUMMARY OF THE INVENTION

An optical fiber according to one aspect of the present invention includes a core and a cladding which are made from silica glass, allows single mode transmission at a wavelength of 1100 nm, and has a mode field diameter of not less than 4 μm at a wavelength of 1100 nm, and a bending loss of not more than 1 dB per turn with a curvature radius of 1 mm at a wavelength of 1100 nm.

An optical fiber ribbon according to another aspect of the present invention includes a plurality of optical fibers according to the present invention which are arranged in parallel.

An optical interconnection system according to still another aspect of the present invention includes a vertically cavity surface emitting laser with an emission wavelength of 1100 to 1200 nm, and an optical fiber according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An SMF fiber generally has a core diameter of 5 to 10 µm, which is smaller than a core diameter of 50 to 62.5 µm of an MMF fiber, and hence requires an accurate connection between the fiber and other optical element such as a light source. Moreover, a communication system in equipment through an optical interconnection sometimes requires almost ten spatial connections between optical elements such as optical fibers and VCSELs with connectors. The connection between the optical elements through spatial connections cause offsets between coupling parts, thereby causing a splicing loss. Accordingly, the offset causes the splicing loss even if mode field diameters (MFDs) among the elements are the same. The more an MFD difference between the coupling elements, the less the coupling efficiency in offset, in other words the splicing loss for the offset tends to increase.

Figure 1:
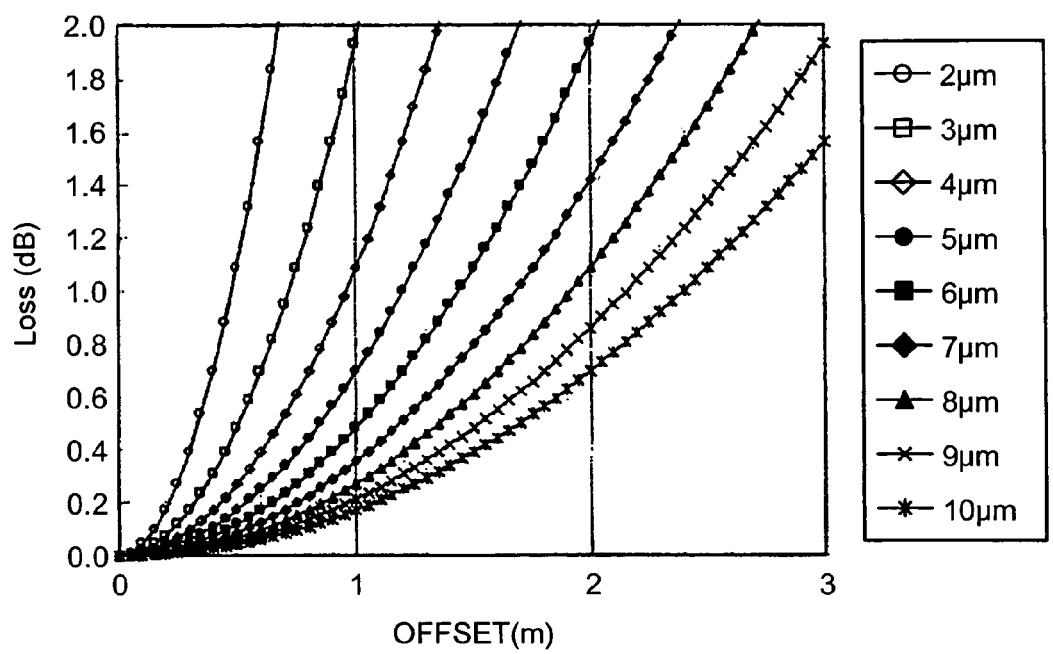
FIG. 1 shows calculated values of a splicing loss with respect to an offset for a connection between the same type of single mode optical fibers.

FIG. 1 shows calculated values of a splicing loss with respect to an offset for a connection between the same type of SMF fibers. The offset is a key parameter for reducing the splicing loss between an optical fiber and a light source, between an optical fiber and a light receiving unit, or between optical fibers. Since the maximum offset due to manufacturing error can be about 1 µm, the optical interconnection system must be designed to allow a 1 µm offset, in light of worst case design.

Referring to FIG. 1, the optical fiber with an MFD of 4 µm causes a splicing loss of about 1.1 dB for an offset of 1 µm. If there are ten connections between a light source, VCSEL and an optical receiver and an offset of 1 µm occurs at each connection, then a splicing loss due to the offset is up to 11 dB. If a typical optical interconnection system with a VCSEL output power of −3 dBm, a receiver sensitivity of −16 dBm, and a fiber length of not less than 50 cm is built, a dynamic range of the system is about 13 dB since the transmission losses at other than the bended potions of the fiber is as low as not less than 0.01 dB. In such a real system, however, the splicing loss essentially includes a loss due to an angular offset at each connection, in addition to 11 dB due to the axis offset. As a result, this assumed system has few margins for a dynamic range of 13 dB. Therefore, the use of an SMF fiber with an MFD of not more than 4 µm makes it difficult to build the optical interconnection system with especially the above parameters.

On the other hand, if a silica glass optical fiber is used for optical wiring in equipment, the fiber is required to allow flexible wiring and compact storage. If a high-speed optical interconnection system is build using such a fiber, the transmission loss of the fiber is desirably almost zero. In other words, the optical fibers for optical interconnection are required to have no bending loss even when bent with a small curvature radius in wiring. In actual optical wiring in equipment, it is expected that a curvature radius of about 1 mm be added to several portions of the wired fiber. The tolerance of bending loss is desirably not more than 1 dB when the fiber is bent with a curvature radius of 1 mm by one turn, in light of local bending of the fiber in wiring and worst case design. This conditional bending loss indicates excellent characteristics of the fiber and allows flexible optical wiring.

It should be noted that a unit of counting bent portions is referred to as "turn" in this description bent portion. One turn means a complete 360° turn of optical fiber. For example, four bent portions each of which is bent 90° in an optical fiber are collectively called "one turn", and two 90° bent portions are collectively called "½ turn".

A normal SMF fiber, when bent one turn with a curvature radius of 5 mm, has a bending loss of almost 30 dB at a wavelength of 1550 nm, and when bent one turn with a curvature radius of 1 mm, has a bending loss of not less than 60 dB at a wavelength of 1550 nm. A loss margin due to bending loss in the system with 13 dB dynamic range is as small as 2 dB, for example. In the system, if the fiber is expected to have 2 turns each having a curvature radius of 1 mm in wiring, the bending loss is required to be as small as not more than 1 dB per turn. Therefore, the normal SMF fiber cannot be used for such a system. As to a normal SMF fiber with a simple index profile, since there is a trade-off between decreasing the bending loss and increasing the MFD, the bending loss and the splicing loss cannot be improved together.

Moreover, the fiber, if wired in equipment, is required to be compactly stored, and may be also bent at many places in equipment with a small curvature radius of about 5 mm due to, for example, a slack of a wiring between chips, in addition to a curvature radius of about 1 mm as described above. The portions bent with a curvature radius of about 1 mm are heat-treated to relax a strain. However, bent portions each having a curvature radius of about 5 mm, which cause at many places in equipment, are not subject to any specific treat like heat treatment. Hence, the fiber may be broken at bent portions each having a curvature radius of about 5 mm, by a stress strain. Accordingly, it is desirable to reduce the failure ratio due to bending.

Generally, the more the diameter of cladding, the more the failure ratio and the strain of the optical fiber in bending. Assume that an optical fiber used in an optical interconnection system has about twenty bent portions each having a curvature radius of about 5 mm and 90°. Let a screening level be 2%, a fatigue factor between the fiber and the coating material be 22, and a product lifetime be 5 years, then the failure rate of a fiber with a cladding diameter of 125 µm is 5.5. However, the failure rate of a fiber with a cladding diameter of 90 µm goes down to 0.04, i.e., about 0.7% of that of the fiber with a cladding diameter of 125 µm. For system design, the failure rate is preferably not more than 0.05. A normal optical fiber does not have an overwhelming need to reduce the failure ratio due to bending. However, it is very effective for the fiber bent with a small diameter as is used in an optical interconnection system to reduce the failure ratio.

The SMF fiber is generally known as having an adverse effect on loss if it has a diameter of cladding not more than ten times the MFD. For this reason, the fiber actually used, which requires an MFD of not lees than 4 µm, requires a diameter of cladding of at least not less than 40 µm.

Figure 2:
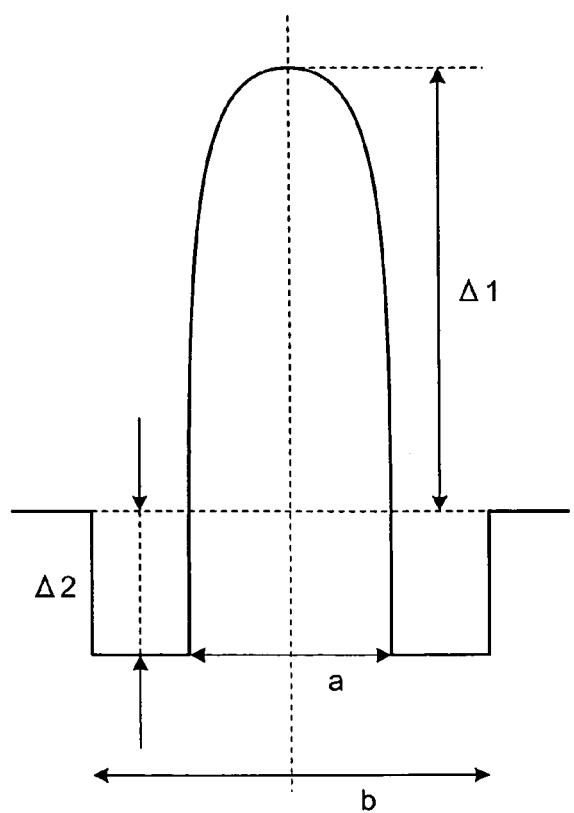
FIG. 2 shows a W-shaped profile of an optical fiber according to the present invention.

As Example 1, a simulation resulted in characteristics of a silica-based optical fiber of the present invention with a W-shaped profile as shown in FIG. 2. This fiber includes a first layer (first core) in which germanium is doped and a depressed layer (second core) in which fluorine is doped. Detailed design factors and calculated characteristics of each layer are shown in the column of Fiber A in Table 1.

TABLE 1

FIBER CHARACTERISTICS ON1 VARIOUS PARAMETERS

| | Δ1 | α1 | Δ2 | Δ3 | a/μm | b/μm | c/μm | MFD/μm 1100 nm | λ c/nm | BENDING LOSS/dB 1100 nm, 1TURN |
|---|---|---|---|---|---|---|---|---|---|---|
| A | 0.9 | 2.0 | −0.4 | — | 7.3 | 10.4 | — | 5.1 | 1078 | 0.8 |
| B | 1.5 | 3.0 | — | — | 4.5 | — | — | 3.9 | 1082 | 0.9 |
| C | 0.9 | 3.0 | −0.4 | 0.2 | 6.1 | 8.7 | 12.2 | 5.2 | 1091 | 0.9 |
| D | 0.8 | 2.5 | 0.0 | −0.4 | 6.9 | 9.9 | 13.7 | 5.0 | 1075 | 0.7 |
| A1 | 0.4 | 7.0 | −0.2 | — | 7.8 | 11.2 | — | 4.1 | 1092 | 3.4 |
| A2 | 0.5 | 7.0 | −0.2 | — | 7.4 | 10.5 | — | 4.3 | 1084 | 0.9 |
| A3 | 1.0 | 1.4 | −0.2 | — | 6.3 | 9.0 | — | 4.0 | 1087 | 2.5 |
| A4 | 1.0 | 1.5 | −0.2 | — | 6.4 | 9.1 | — | 4.1 | 1067 | 0.8 |
| A5 | 1.3 | 2.0 | −0.1 | — | 3.4 | 4.9 | — | 3.8 | 1078 | 0.7 |
| A6 | 1.3 | 2.0 | −0.2 | — | 3.3 | 4.7 | — | 4.0 | 1073 | 0.9 |
| C1 | 0.4 | 7.5 | −0.3 | 0.2 | 6.3 | 9.0 | 11.7 | 4.1 | 1090 | 2.9 |
| C2 | 0.5 | 7.5 | −0.3 | 0.2 | 5.9 | 8.5 | 11.9 | 4.3 | 1079 | 0.7 |
| C3 | 0.9 | 1.4 | −0.3 | 0.3 | 6.5 | 9.3 | 12.8 | 4.2 | 1084 | 1.5 |
| C4 | 0.9 | 1.5 | −0.3 | 0.3 | 6.4 | 9.1 | 12.3 | 4.1 | 1072 | 0.4 |
| C5 | 1.0 | 6.5 | −0.1 | 0.2 | 4.5 | 6.0 | 8.4 | 3.5 | 1078 | 0.8 |
| C6 | 1.0 | 6.5 | −0.2 | 0.2 | 4.8 | 6.5 | 8.3 | 4.0 | 1089 | 0.5 |
| C7 | 0.8 | 2.0 | −0.3 | 0.1 | 6.4 | 9.1 | 12.7 | 3.7 | 1075 | 0.4 |
| C8 | 0.8 | 2.0 | −0.3 | 0.2 | 6.5 | 9.3 | 13.0 | 4.1 | 1072 | 0.8 |
| D1 | 0.4 | 6.0 | 0.0 | −0.2 | 7.4 | 10.5 | 14.7 | 4.1 | 1089 | 5.4 |
| D2 | 0.5 | 6.0 | 0.0 | −0.2 | 6.8 | 9.8 | 13.7 | 4.2 | 1068 | 0.7 |
| D3 | 0.8 | 1.4 | 0.0 | −0.3 | 8.1 | 11.6 | 16.2 | 4.0 | 1090 | 2.5 |
| D4 | 0.8 | 1.5 | 0.0 | −0.3 | 7.8 | 11.1 | 15.5 | 4.1 | 1071 | 0.8 |
| D5 | 0.8 | 2.0 | 0.0 | −0.1 | 7.6 | 11.3 | 15.3 | 3.8 | 1086 | 0.7 |
| D6 | 0.8 | 2.0 | 0.0 | −0.2 | 7.9 | 11.6 | 15.8 | 4.3 | 1078 | 0.7 |

In Table 1, α1 is α representing the shape of a refractive-index profile of the first core, and defined by expression (1):

$$n^2(r) = n_{c1}^2 \{1 - 2 \cdot (\Delta 1/100) \cdot (2r/a)^\alpha\} \quad (1)$$

where $0 < r < a/2$, r represents a radial length from the center of the fiber, n(r) represents a refractive-index at length r, $n_{c1}$ is the maximum refractive-index of the first core, and a is a diameter of the first core.

Δ1 and Δ2 are a relative refractive index difference of the first core with respect to the cladding, and a relative refractive index difference of the second core with respect to the cladding, respectively, represented by expressions (2) and (3):

$$\Delta 1 = \{(n_{c1} - n_c)/n_{c1}\} \cdot 100 \quad (2)$$

$$\Delta 2 = \{(n_{c2} - n_c)/n_{c2}\} \cdot 100 \quad (3)$$

where $n_{c1}$ is the maximum refractive-index of the first core, $n_{c2}$ is the minimum refractive-index of the second core, and $n_c$ is a refractive-index of the cladding.

This fiber had an MFD of 5.1 μm at a wavelength of 1100 nm, operated at the same wavelength as a single mode fiber, and had a bending loss of 0.8 dB per turn with a curvature radius of 1 mm at the same wavelength. Another simulation on various parameters for the optical fiber with the W-shaped profile of FIG. 2 resulted in characteristics shown in the columns of Fibers A1 to A6 in Table 1. Referring to A and A1 to A6 in Table 1, Fiber A, A2, A4, and A6 have an MFD of not less than 4 μm at a wavelength of 1100 nm, allow single mode transmission, and have a bending loss of not more than 1 dB per turn at a wavelength of 1100 nm. As can be seen from these simulation results, the fibers with the W-shaped profile as shown in FIG. 2, if having a relative refractive index difference of the first core (Δ1) of not less than 0.5%, α of not less than 1.5, and a relative refractive index difference of the second core (Δ2) of not more than −0.2%, can be provided as desired.

Figure 3:
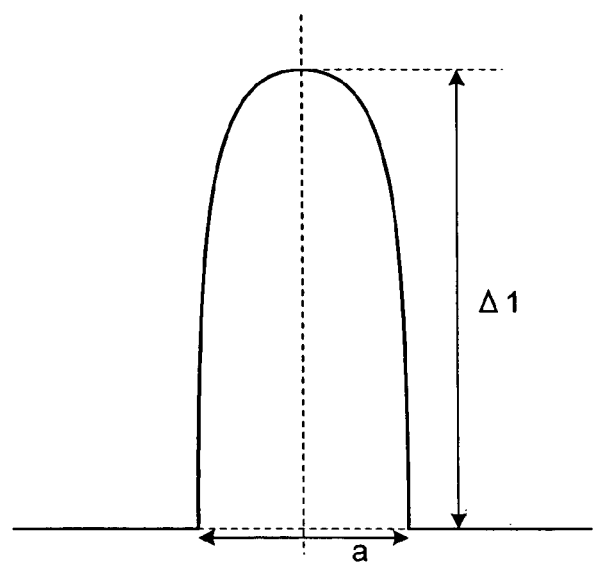
FIG. 3 shows a simple index profile of a conventional optical fiber.

To be compared with the optical fiber according to the present invention, still another simulation resulted in characteristics of an optical fiber having a low bending loss of 1.0 dB per turn with a curvature radius of 1 mm at a wavelength of 1100 nm, and a simple index profile as shown in FIG. 3. The column of Fiber B in Table 1 shows calculated characteristics. Referring to it, Fiber B has an MFD of 3.9 μm at a wavelength of 1100 nm.

Figure 4:
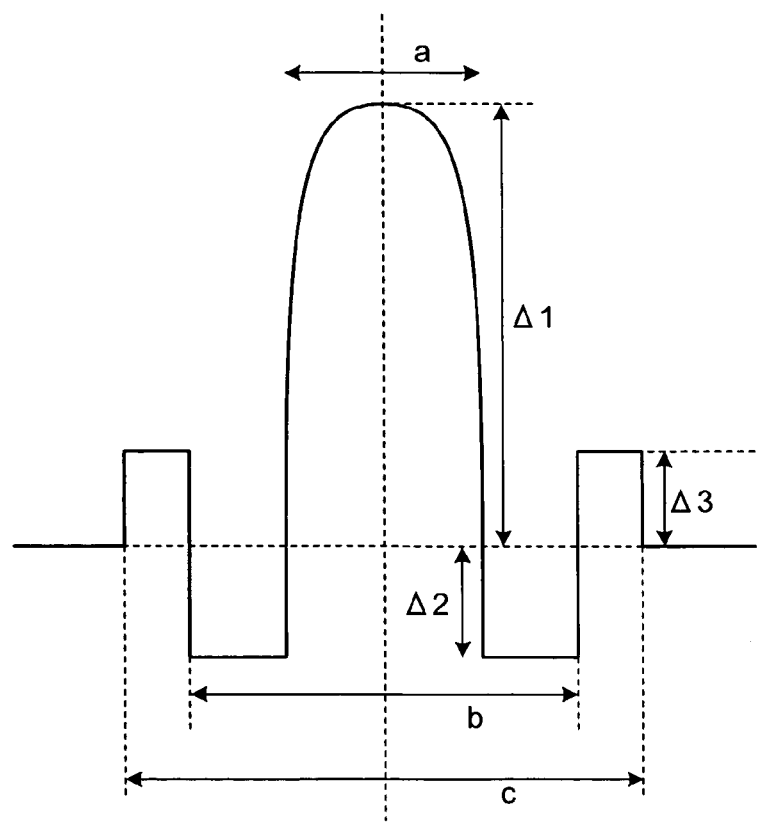
FIG. 4 shows a W-segmented profile of the optical fiber according to the present invention.

As Example 2, a simulation resulted in characteristics of a silica-based optical fiber of the present invention with a W-segmented profile as shown in FIG. 4. This fiber includes a first layer (first core) in which germanium is doped, a depressed layer (second core) in which fluorine is doped, and a segment layer (third core) in which germanium is doped. Detailed design factors and calculated characteristics of each layer are shown in the column of Fiber C in Table 1. Δ3 is a relative refractive index difference of the third core with respect to the cladding, represented by expression (4):

$$\Delta 3 = \{(n_{c3} - n_c)/n_{c3}\} \cdot 100 \quad (4)$$

where $n_{c3}$ is the maximum refractive-index of the third core on the W-segmented profile.

This fiber had an MFD of 5.2 μm at a wavelength of 1100 nm, operated at the same wavelength as a single mode fiber, and had a bending loss of 0.9 dB per turn with a curvature radius of 1 mm at the same wavelength. Another simulation on various parameters for the optical fiber with the W-segmented profile of FIG. 4 resulted in characteristics shown in the columns of Fibers C1 to C8 in Table 1. Referring to C and C1 to C8 in Table 1, Fibers C, C2, C4, and C6 have an MFD of not less than 4 μm at a wavelength of 1100 nm, allow single mode transmission, and have a bending loss of not more than 1 dB per turn at a wavelength of 1100 nm. As can be seen from these simulation results, the fibers with the W-segmented profile as shown in FIG. 4, if having a relative refractive index difference of the first core (Δ1) of not less than 0.5%, a of not less than 1.5, a relative refractive index difference of the second core (Δ2) of not more than −0.2%, and a relative refractive index difference of the third core (Δ3) of not less than 0.2%, can be provided as desired.

Figure 5:
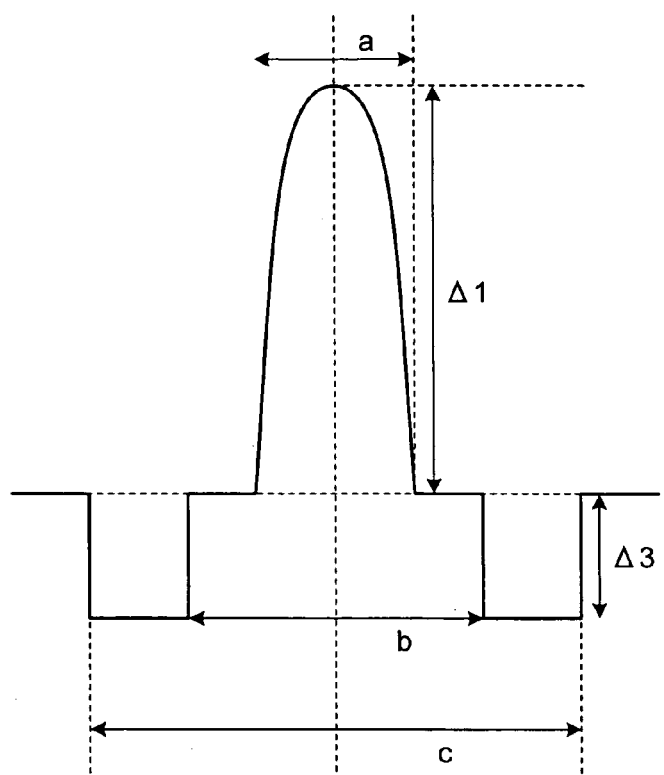
FIG. 5 shows a quasi-W-shaped profile of the optical fiber according to the present invention.

As Example 3, a simulation resulted in characteristics of a silica-based optical fiber of the present invention with a quasi-W-shaped profile as shown in FIG. 5. This fiber includes a first layer (first core) in which germanium is doped, a silica layer (second core), and a depressed layer (third core) in which fluorine is doped. Detailed design factors and calculated characteristics of each layer are shown in the column of Fiber D in Table 1. Like Example 2, $\Delta 3$ is a relative refractive index difference of the third core with respect to the cladding, represented by expression (4). Here, $n_{c3}$ in expression (4) is the minimum refractive-index of the third core on the quasi-W-shaped profile.

This fiber had an MFD of 5.0 μm at a wavelength of 1100 nm, operated at the same wavelength as a single mode fiber, and had a bending loss of 0.7 dB per turn with a curvature radius of 1 mm at the same wavelength. Another simulation on various parameters for the optical fiber with the quasi-W-shaped profile of FIG. 5 resulted in characteristics shown in the columns of Fibers D1 to D6 in Table 1. Referring to D and D1 to D6 in Table 1, Fibers D, D2, D4, and D6 have an MFD of not less than 4 μm at a wavelength of 1100 nm, allow single mode transmission, and have a bending loss of not more than 1 dB per turn at a wavelength of 1100 nm. As can be seen from these simulation results, the fibers with the quasi-W-shaped profile as shown in FIG. 5, if having a relative refractive index difference of the first core ($\Delta 1$) of not less than 0.5%, α of not less than 1.5, a relative refractive index difference of the second core ($\Delta 2$) of substantially 0%, and a relative refractive index difference of the third core ($\Delta 3$) of not more than −0.2%, can be provided as desired.

As described above, SMF fibers with a simple index profile, if having the same MFD, have the same bending loss regardless of core profile when the cutoff wavelength is determined by changing the core diameter. However, the fibers with the W-shaped profile in which the depressed layer is provided over the first core as the second core can have variable MFDs at the same bending loss and cutoff wavelength as those of the fibers with the simple index profile. This is because the depressed layer causes no red-shift of the cutoff wavelength even if the relative refractive index difference ($\Delta$) of the centered core is increased, thereby there is no need for reducing the core diameter. Moreover, providing the depressed layer as the second core, the profile of the first core has a substantial impact on the MFD. The less the parameter a representing the shape of a refractive-index profile of the first core, the less the optical confinement effect and the more the MFD. MFD is not so influenced by the relative refractive index difference ($\Delta$) or the width of the depressed layer.

Optical fibers are sometimes used in ribbon form for optical interconnection. The optical fiber ribbon allows multichannel optical transmission and high-speed optical communication. A coated silica glass optical fiber generally has an outer-diameter of 250 μm for a cladding diameter of 125 μm, and an optical fiber ribbon including a plurality of fibers bonded in parallel to each other typically has a pitch of 250 μm. A small-diameter fiber, whose outer diameter is very small, also has a small coating diameter, thereby allowing manufacturing an optical fiber ribbon with a pitch narrower than that of conventional fiber ribbons. Therefore, the small-diameter fiber with a cladding diameter of 40 to 90 μm is preferably used. The narrow-pitch fiber ribbon using small-diameter fibers is more flexible in wiring, allows space-saving storage, and is an optical element suitable for optical interconnection.

Figure 6:
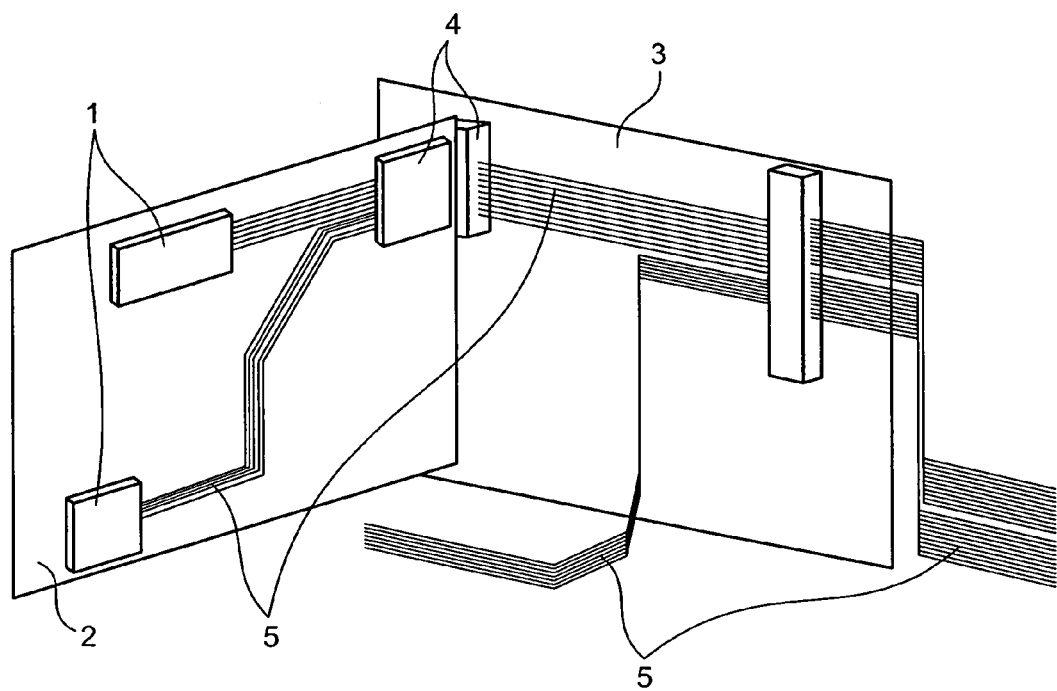
FIG. 6 shows a configuration of an optical interconnection system using the optical fiber according to the present invention.

As shown in the calculated parameters in Examples 1 to 3, the optical fiber according to the present invention allows single mode optical transmission at a wavelength of 1100 nm, and is superior in characteristics of bending loss and splicing loss. FIG. 6 shows a configuration of an optical interconnection system using an optical fiber ribbon including the optical fiber according to the present invention as a transmission medium. The optical interconnection system shown in FIG. 6 uses a VCSEL with an emission wavelength of 1100 nm as a light source, and further includes a backboard 3 and a printed circuit board 2 connected to the backboard 3 through connectors 4. On the printed circuit board 2, optic input/output devices 1 are mounted, and are connected to the connectors 4 through small-diameter fiber ribbons 5 as described above. Hence, the printed circuit board 2 and the backboard 3 are optically connected. The small-diameter fiber ribbons 5 also are laid out on the backboard 3, thereby allowing optical connection between optical interconnection systems.

The optical fiber in Example 1 (Fiber A in Table 1) was actually manufactured so that its cladding diameter would be 80 μm. Table 2 shows detailed parameters of the refractive index profiles and optical characteristics of the manufactured fiber. The optical fiber with characteristics almost as simulated was obtained.

TABLE 2

CHARACTERISTICS OF TEST FIBER (a) STRUCTURAL PARAMETERS

| $\Delta 1$ | $\alpha 1$ | $\Delta 2$ | a/μm | b/μm |
|---|---|---|---|---|
| 0.9 | 1.9 | −0.4 | 7.5 | 10.2 |

(b) OPTICAL CHARACTERISTICS

| $\lambda c$/nm | MFD/μm (1100 nm) | MFD/μm (1200 nm) | BENDING LOSS/dB 1100 nm, 1TURN | BENDING LOSS/dB 1200 nm, 1TURN |
|---|---|---|---|---|
| 1085 | 5.1 | 5.3 | 0.9 | 1.3 |

Fiber A has a W-shaped profile, and its MFD increases and its effective refractive index decreases, as the wavelength is long. Therefore, the MFD at a wavelength of 1200 nm is more than that at a wavelength of 1100 nm, whereas the bending loss at a wavelength of 1200 nm is more than that at a wavelength of 1100 nm. Let the loss margin of bending loss be 5 dB, bending tolerance is up to 5 turns with a curvature radius of 1 mm at a wavelength of 1100 nm. At a wavelength of 1200 nm, bending tolerance is up to 4 turns with a curvature radius of 1 mm.

An optical fiber ribbon was actually manufactured using the optical fiber shown in Table 2, and an optical interconnection system was actually built using the manufactured optical fiber ribbon and a VCSEL with an emission wavelength of 1200 nm, which is the same as the configuration shown in FIG. 6.

Figure 7:
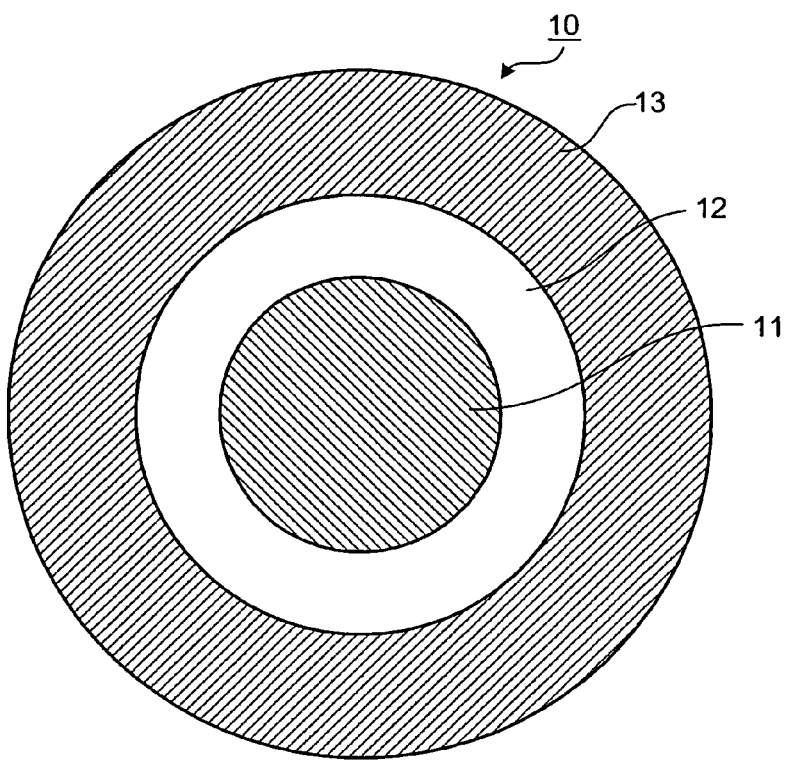
FIG. 7 is a sectional view of an optical fiber according to the present invention.
Figure 8:
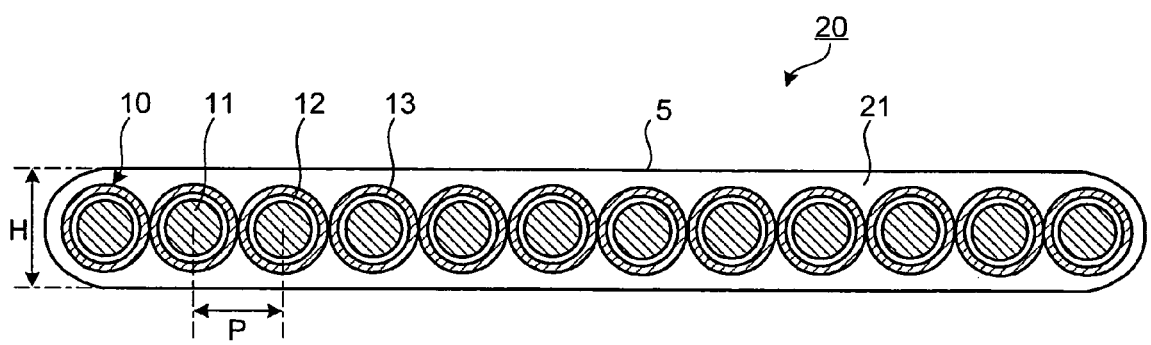
FIG. 8 is a sectional view of an optical fiber ribbon according to the present invention.

As shown in FIG. 7, let the diameter of a cladding 11 be 80 μm, the outer diameter of a first coating resin 12 be 110 μm, and the outer diameter of a second coating resin 13 be 125 μm. Moreover, as shown in FIG. 8, a small-diameter optical fiber ribbon 20 was manufactured by arranging twelve optical fibers 10 with the pitch P=125 μm in parallel, and coating it with a coating resin 21 to bond the optical fibers 10 with each other. Taking into account an increase in loss due to the thin-walled coating resin 21 and space-saving, the coating diameter H (thickness H) was determined to be 170 μm. The optical fiber ribbon 20 with the pitch P=125 μm has half the size of a conventional optical fiber ribbon and extreme high flexibility, and allows space-saving storage in equipment. As the material of the coating resin 21, ultraviolet curing resin was used.

The pitch P can be as small as 60 μm if an optical fiber with a cladding diameter of 40 μm and a difference between the outer diameter of the coating and the outer diameter of the cladding of 20 μm is used.

The finished optical fiber ribbon 20 was 1.55 mm in width W and 0.17 mm in thickness H. If the VCSEL to be connected to the fiber ribbon is a twelve-channel laser array with a pitch of 125 μm, the manufactured fiber ribbon 20 allows multiple optical connection. In this configuration, a directly modulated VCSEL allows super high-speed optical connection over 100 Gbps.

The optical fiber according to Examples allows single mode transmission at a wavelength of 1100 nm and a VCSEL with an emission wavelength of 1100 nm may be used in an optical interconnection system, whereas the VCSEL with an emission wavelength of 1200 nm was used in Examples.

A flame retardant ribbon was manufactured using flame retardant ultraviolet curing urethane acrylate resin as ultraviolet curing resin for the material of the coating resin 21. The flame retardant ultraviolet curing urethane acrylate resin was made as follows. Addition of (1) Halogen additive such as bromine or chlorine, (2) antimony compound such as antimony trioxide or triphenylethylene antimony, (3) metallic hydrate such as aluminium hydroxide or magnesium hydroxide, or (4) phosphorus compound such as phosphate ester, to resin is examined to obtain flame retardant resin. Moreover, halogenation of prepolymer of which ultraviolet curing resin consists or acrylic monomer with bromine or chlorine, and further addition of phosphorus are examined to obtain flame retardant resin. Among these processes, addition of bromine-based flame retardant to resin was found effective in flame retardant.

The reason why such a change in composition provides flame retardant is viewed as covering the surface of resin with product due to decomposition reaction or as formation of shielding layer between resin and air by decomposition gas generated in burning. The reason is also viewed as prevention of continuous burning by radical generated from halogenated compound or growth of resin in three dimensions by cross-link.

An optical fiber ribbon obtained using ultraviolet curing urethane acrylate resin including flame retardant to prepare ultraviolet curing resin for ribbon was evaluated by a 60° inclined flame test conforming to JIS C3005. As a result, the flame added to the fiber was quenched spontaneously in an average of about 3.2 sec, which satisfies JIS C3005. Thermoplastic flame retardant resin may be used instead of flame retardant ultraviolet curing resin in Examples.

The use of all or a part of the optical fiber coating resin, and ribbon coating resin as flame retardant ultraviolet curing resin was examined for high flame retardant of resin. Eventually, an optical fiber ribbon obtained using ultraviolet curing urethane acrylate resin including flame retardant to prepare ultraviolet curing resin for ribbon was evaluated by a 60° inclined flame test conforming to JIS C3005. As a result, the flame added to the fiber was quenched spontaneously in an average of about 2.6 sec, which satisfies JIS C3005.

In addition, Under vertical flame test conforming to UL1581, the flame added to the fiber was quenched spontaneously in an average of 5.7 sec, which satisfies UL1581 without burned dropping. As a result of the vertical flame test on a wire of the fiber, the flame added to the fiber was quenched spontaneously in an average of 7.6 sec, and the wire and a ribbon had both good flame retardant. Thermoplastic flame retardant resin may be used instead of flame retardant ultraviolet curing resin in Examples.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber, comprising:
   a core and a cladding which are made from silica glass,
   said optical fiber configured to allow single mode transmission at a wavelength less than or equal to 1100 nm, and
   having a mode field diameter of not less than 4 μm at a wavelength of 1100 nm, and a bending loss of not more than 1 dB per turn with a curvature radius of 1 mm at a wavelength of 1100 nm.

2. The optical fiber according to claim 1, said cladding having a cladding diameter of 40 to 90 μm.

3. The optical fiber according to claim 1, wherein the core includes a first core and a second core surrounding the first core, the first core having a relative refractive index difference of not less than 0.5% and not more than 1.3% and α of not less than 1.5 representing a shape of a refractive-index profile of the first core, the second core having a relative refractive index difference of not more than −0.2%.

4. The optical fiber according to claim 1, wherein the core includes a first core, a second core surrounding the first core, and a third core surrounding the second core, the first core having a relative refractive index difference of not less than 0. 5% and a of not less than 1.5 representing a shape of a refractive-index profile of the first core, the second core having a relative refractive index difference of substantially 0%, the third core having a relative refractive index difference of not more than −0.2%.

5. The optical fiber according to claim 1, wherein the core includes a first core, a second core surrounding the first core, and a third core surrounding the second core, the first core having a relative refractive index difference of not less than 0.5% and not more than 1.0%, and α of not less than 1.5 representing a shape of a refractive-index profile of the first core, the second core having a relative refractive index difference of not more than −0.2%, the third core having a relative refractive index difference of not less than 0.2%.

6. The optical fiber according to claim 1, further comprising a coating made from ultraviolet curing resin at least a part of which includes a flame retardant material.

7. The optical fiber according to claim 1, further comprising a coating made from thermal curing resin at least a part of which includes a flame retardant material.

8. The optical fiber according claim 1, wherein said optical fiber is configured to allow single mode transmission at a wavelength less than or equal to 1092 nm.

9. The optical fiber according to claim 1, wherein said optical fiber is configured to allow single mode transmission at a wavelength less than or equal to 1084 nm.

10. The optical fiber according to claim 9, wherein said optical fiber is configured to allow single mode transmission at a wavelength greater than or equal to 1067 nm and less than or equal to 1084 nm.

11. An optical fiber ribbon comprising:
a plurality of optical fibers arranged in parallel, wherein each optical fiber comprises
a core and a cladding which are made from silica glass,
said optical fiber configured to allow single mode transmission at a wavelength less than or equal to 1100 nm, and
have a mode field diameter of not less than 4 μm at a wavelength of 1100 nm, and a bending loss of not more than 1 dB per turn with a curvature radius of 1 mm at a wavelength of 1100 nm.

12. The optical fiber ribbon according to claim 11, further comprising a coating made from ultraviolet curing resin at least a part of which includes a flame retardant material.

13. The optical fiber ribbon according to claim 11, further comprising a coating made from thermal curing resin at least a part of which includes a flame retardant material.

14. The optical fiber ribbon according to claim 11, wherein said optical fiber is configured to allow single mode transmission at a wavelength less than or equal to 1092 nm.

15. The optical fiber ribbon according claim 14, wherein said optical fiber is configured to allow single mode transmission at a wavelength less than or equal to 1084 nm.

16. The optical fiber ribbon according to claim 15, wherein said optical fiber is configured to allow single mode transmission at a wavelength greater than or equal to 1067 nm and less than or equal to 1084 nm.

17. An optical interconnection system, comprising:
a vertically cavity surface emitting laser with an emission wavelength of 1100 to 1200 nm; and
an optical fiber which includes a core and a cladding which are made from silica glass, the optical fiber configured to
allow single mode transmission at a wavelength less than or equal to 1100 nm, and
having a mode field diameter of not less than 4 μm at a wavelength of 1100 nm, and a bending loss of not more than 1 dB per turn with a curvature radius of 1 mm at a wavelength of 1100 nm.

18. The optical interconnection system according to claim 17, wherein said optical fiber is configured to allow single mode transmission at a wavelength less than or equal to 1092 nm.

19. The optical interconnection system according to claim 18, wherein said optical fiber is configured to allow single mode transmission at a wavelength less than or equal to 1084 nm.

20. The optical interconnection system according to claim 19, wherein said optical fiber is configured to allow single mode transmission at a wavelength greater than or equal to 1067 nm and less than or equal to 1084 nm.

* * * * *